(12) United States Patent
Bergmann et al.

(10) Patent No.: US 6,282,344 B1
(45) Date of Patent: Aug. 28, 2001

(54) INTERSECTING N X M STAR COUPLERS FOR ROUTING OPTICAL SIGNALS

(75) Inventors: Ernest Eisenhardt Bergmann, Fountain Hill; Gail Ann Bogert, Bethlehem, both of PA (US)

(73) Assignee: Agere Systems Optoelectronics Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/456,361

(22) Filed: Dec. 8, 1999

(51) Int. Cl.[7] ....................................................... G02B 6/26
(52) U.S. Cl. ................................. 385/46; 385/17; 385/37
(58) Field of Search ................................. 385/15, 17, 37, 385/39, 46, 50, 51

(56) References Cited

U.S. PATENT DOCUMENTS

| | | | |
|---|---|---|---|
| 5,339,157 | * 8/1994 | Glance et al. | 385/46 |
| 5,754,320 | * 5/1998 | Watanabe et al. | 385/17 |
| 5,809,184 | * 9/1998 | Doerr et al. | 385/37 |
| 6,067,388 | * 5/2000 | Fabricius et al. | 385/46 |
| 6,094,513 | * 7/2000 | Rigny et al. | 385/46 |
| 6,163,637 | * 12/2000 | Zirngibl | 385/46 |

OTHER PUBLICATIONS

R. Adar, C. Henry, C. Dragone. R. C. Kistler and M. Milbrodt. Broad–Band Array Multiplexers Made with Silica Waveguides on Silicon (2/93) *Journal of Lightwave Technology* vol. 11, No. 2 pp. 212–219

* cited by examiner

*Primary Examiner*—Darren Schuberg

(57) ABSTRACT

Overlapped coupler combination Photonic Lightguide Circuits for routing optical signals within an optical communication system include at least two couplers whose planar slab waveguides are disposed in supportedly overlying relation so as to conserve wafer real estate. In a preferred form of the invention wherein a Dragone router is implemented, output waveguides of a first of the couplers are connected to the input waveguides of a second of the couplers at a predetermined angle so as to create path length differences in the individual optical signals traversing through the various waveguides. These path length differences ensure that the optical signals have good wavelength differentiation so that a large number of channels can be accommodated. The signals traverse through the couplers in uniform or non-uniform spaced channels of less than about 100 GHz, and more preferably less than about 25 GHz. The coupler combination devices are particularly useful as Dragone routers and other types of DWDM routers.

14 Claims, 3 Drawing Sheets

INTERSECTING N X M STAR COUPLERS FOR ROUTING OPTICAL SIGNALS

BACKGROUND OF THE INVENTION

1. Field of the Invention

This invention relates generally to star couplers for routing optical signals through optical communication systems. More specifically, the invention relates to optical coupler combinations having overlapped star couplers with at least one input waveguide and at least one output waveguide for guiding optical signals to and through the coupler combination.

2. Description of the Related Art

Photonic Lightguide Circuits (PLCs) are components used in optical communication systems for routing optical signals through the systems to enable optical communication. PLCs typically comprise substrate materials, typically glass or silicon but oftentimes other more exotic materials. Lithographic means and processes are used to produce optical structures and subcomponents such as waveguides near the surface of the substrate. Light is guided near the surface region of the substrate where optical signals can be routed through the PLC. The optical subcomponents on the PLCs optically process the light traversing the surface of the substrate so that the PLC can perform the particular function for which it is designed. One such optical component is an optical N×M coupler. In the past, optical couplers have taken up a large amount of "real estate" in the PLC and have also been limited with respect to the number of channels that can be routed through the couplers since they are physically less able to handle many input waveguides having different channel frequencies. Thus, current optical couplers for PLCs are not optimally functional for use in modern, dense wavelength division multiplexed (DWDM) optical communication systems.

It has been known to place two N×M star couplers in the PLC to provide stable, low-loss connections between them, particularly in Dragone routers which are a well-known type of PLC. The N×M star couplers are made by N input waveguides arrayed along a circular arc that is approximately centered about a second arc. On the second arc M output waveguides are approximately centered about the central waveguide end of the first circular arc. Personnel of the assignee of the present invention have developed a wafer having two overlapped star couplers to create two Dragone routers each consisting of a pair of star couplers on a single wafer, and wherein the Dragone router on the wafer with the best performance is utilized while the other is discarded or ignored. This overlapping of couplers did not, however, produce a PLC wherein the overlapped couplers could be used simultaneously and instead the couplers were overlapped merely to maximize the probability that at least one highly functional Dragone router would be created during the fabrication process.

Other methods have been proposed for producing a plurality of working routers by folding or overlapping routers to save space on a wafer. See T. Brenner et al., Electronics Letters, Vol. 32, 18 (Aug. 29, 1996). However, the couplers of Brenner et al. are not intended to be used simultaneously but, rather, are designed to produce multiple routers that are then individually cleaved or diced from the wafer to produce a plurality of separate PLCs with independent star couplers.

There exists a long-felt need in the art, recognized by the inventors of the present invention, for PLCs that include overlapped N×M star couplers so that optical signals in the PLC can be routed over one another without interfering with each other. Furthermore, PLCs of this type should maximize the utilization of space on a wafer, thereby conserving and better utilizing the available real estate thereon. Moreover, the use of overlapped N×M star couplers in PLCs should promote the capability to make more compact DWDM routers with smaller inter-channel wavelength spacings. Such needs have not heretofore been satisfied or achieved in the art.

SUMMARY OF THE INVENTION

The aforementioned long-felt needs are met, and problems solved, by overlapping coupler combination PLCs provided in accordance with the present invention for routing optical signals within an optical communication system. The coupler combination PLCs comprise first and second couplers that overlie each other each having planar slab waveguides for distributing the optical signals through the couplers. The first and second couplers each further comprise at least one input waveguide connected to input regions of the first and second couplers for guiding the optical signals to the planar slab waveguides, and each further comprise at least one output waveguide connected to output regions of the first and second couplers for guiding the optical signals out of the couplers. In a preferred form of the invention, the coupler combination forms a Dragone router wherein each of the output waveguides of the first coupler are optically connected to each of the input waveguides of the second coupler, and the output waveguides of the first coupler are disposed at an angle with respect to the input waveguides of the second coupler. This angle helps create path length differences amongst the optical connections leading between the first and second couplers and favors the optical signals of a particular wavelength entering particular inputs of the first coupler to be constructively coupled to particular outputs of the second coupler.

The coupler combinations of the present invention maximize use of the area of a wafer on which the PLC is fabricated, thereby increasing the manufacturing efficiency in constructing the PLC with a given amount of functionality and reducing the cost of the inventive coupler combination. Furthermore, by overlapping individual couplers and disposing the output waveguides at an angle with respect to the input waveguides as herein described, it is possible to control the constructive interference of the optical signals traversing through the individual waveguides. And, by creating a progressive path length difference of about at least one integral wavelength amongst the optical connections as a result of the angular orientation of the waveguides, a clean, highly constructive signal may be passed out of the PLCs of the present invention within the optical communication system in which the PLC is to be utilized. This allows a Dragone router to be constructed with high resolution in a limited amount of space and to provide high integrity optical communication of signals which is especially advantageous in DWDM systems having many signal channels spaced as little as 25 GHz apart. Such results have not heretofore been achieved in the art. These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals identify similar elements throughout the several views.

DETAILED DESCRIPTION OF THE PRESENTLY PREFERRED EMBODIMENTS

Figure 1:
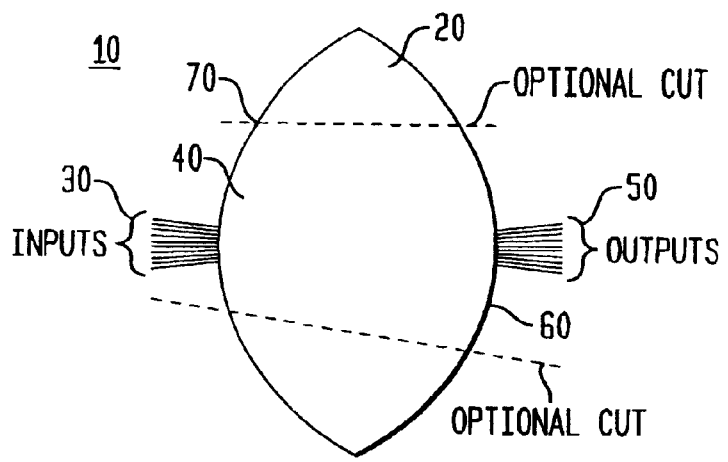
FIG. 1 shows a prior art N×M star coupler.

FIG. 1 depicts a prior art star coupler at 10. The prior art star coupler is so named because it has an input connected to a large number of outputs. Star coupler 10 includes a planar slab waveguide 20 having M input waveguides 30 coupled to an input region 40 of planar slab waveguide 20, and N output waveguides 50 coupled to an output region 60 of planar slab waveguide 20, to generally form the shape of a starburst pattern. The prior art coupler 10 is commonly used in PLCs such as Dragone routers and is operable to direct, through planar slab waveguide 20, optical signals input to planar slab waveguide 20 from input waveguides 30. Output waveguides 50 conventionally receive the distributed optical signals and connect, couple or transfer them to other parts of an optical communication system in which coupler 10 is utilized or to other parts of the PLC in which the coupler 10 is found. In this manner, prior art couplers function to distribute optical signals to, from and within an optical communication system in which the couplers and devices utilizing such couplers are placed. The numbers M and N are chosen for the particular application in which the coupler 10 is to be used. M and N are at least each one. Preferably, M+N is at least 3, and even more preferably M+N is at least 8.

The planar slab waveguide 20 is generally a transparent material such as, for example, glass or silicon dioxide, of higher index of refraction than the immediately surrounding material. The planar slab waveguide may also comprise polymer materials, plastic materials and epoxies. Planar slab waveguide 20 is preferably photolithographically constructed and defines a spreading region or area through which the optical signals are directed or spread. The waveguides 30, 50 are also photolithographically constructed but define a thin region or path for the optical signals. Moreover, it has been desirable to broadly confine the area of planar slab waveguide 20 at the optional cut lines 70 to remove unnecessary surface area so that coupler 10 can be more readily placed on the limited surface of the PLC.

Figure 2A:
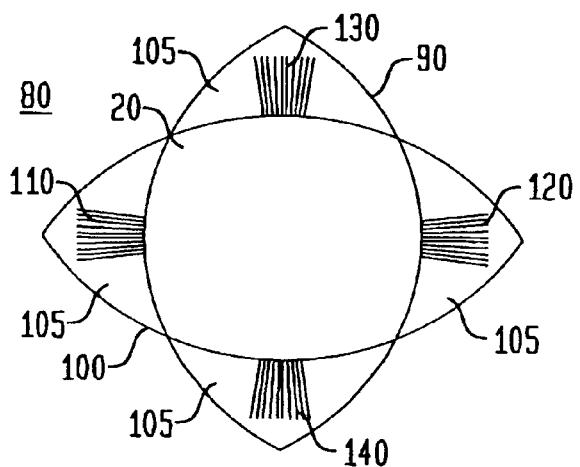
FIG. 2a depicts a conceptual embodiment of an overlapped coupler combination of the present invention.

The basic design of the prior art star coupler of FIG. 1 is utilized in accordance with the present invention to produce overlapped N×M couplers. While in the exemplary embodiment herein a star coupler configuration has been used and described, it will be appreciated by those skilled in the art that any coupler configuration may be implemented to produce overlapped couplers as disclosed and claimed herein. Thus, and referring now specifically to FIG. 2a, a conceptual overlapped star coupler combination in accordance with the present invention is depicted at 80. The combination 80 comprises two star couplers 90, 100 which are fabricated on a PLC so that coupler 90 co-exists with coupler 100. Coupler 90 preferably comprises a first plurality of input waveguides 110 and a first plurality of output waveguides 120 coupled to the planar slab waveguide 20 as described above. Similarly, coupler 100 comprises a second plurality of input waveguides 130 and a second plurality of output waveguides 140.

Figure 2B:
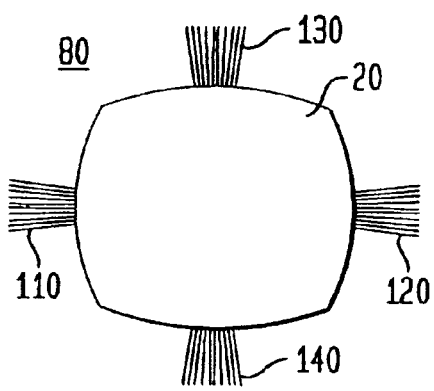
FIG. 2b depicts a practical embodiment of an overlapped star coupler of the present invention wherein excess planar slab waveguide material in the individual couplers has been removed.
Figure 2C:
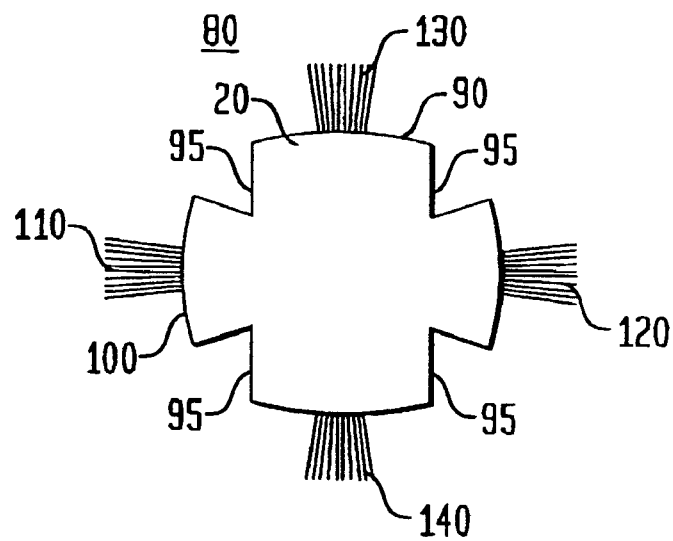
FIG. 2c depicts an overlapped coupler combination of the present invention having optional cuts made n the individual couplers of the combination.

FIG. 2b depicts a preferred embodiment of a star coupler combination of the present invention wherein excess portions 105 of the planar slab waveguides have been removed. The coupler combination of FIG. 2b is a practical construction that can be implemented to produce PLCs in accordance with the invention. Similarly, FIG. 2c depicts the coupler combination of FIGS. 2a and 2b wherein the corner portions of the individual couplers 90, 100 have been optionally removed leaving open corner portions 95 which aids in conserving wafer space and reduces possible, undesired cross-coupling between the two star couplers. In FIG. 2c, the planar slab waveguide 20 is shared by the two overlapping couplers 90, 100, but each of the couplers operates independently.

Figure 3:
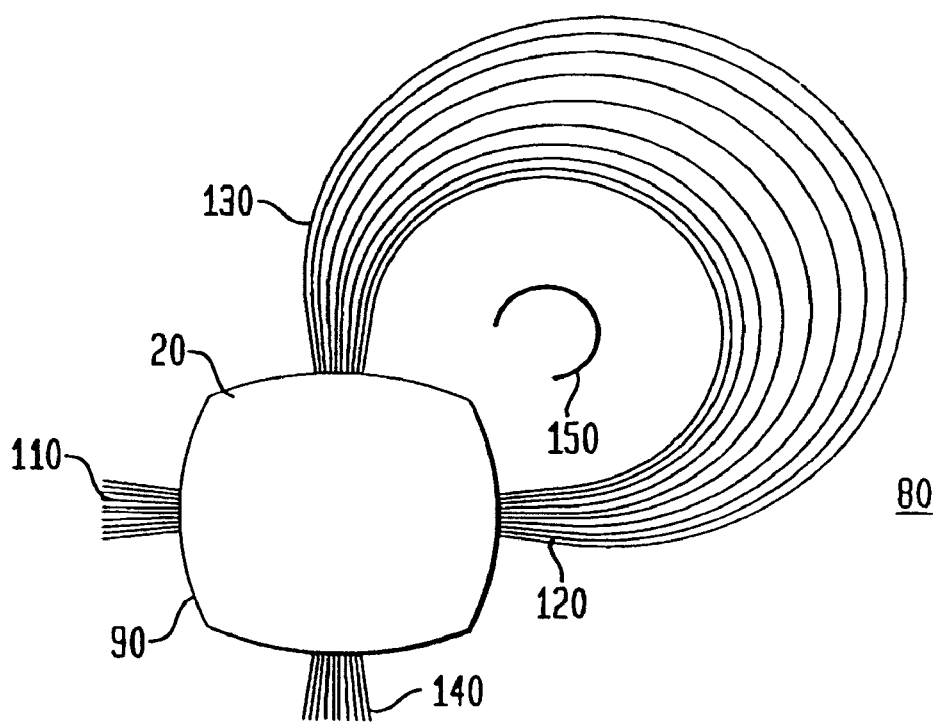
FIG. 3 depicts an overlapped coupler combination of the present invention configured as a Dragon router.

In FIG. 3, the unnecessary outer regions 105 (FIG. 2a) of each of the couplers 90, 100 have been removed from the respective couplers and each of the individual waveguides in the first plurality of output waveguides 120 has been connected to the individual waveguides in the second plurality of input waveguides 130 by means of progressively increasingly longer waveguides to create a Dragone router from the overlapped combination 80. The first plurality of output waveguides defines an angle 150 (in this case about a 270° angle) with respect to the second plurality of input waveguides. Since angle 150 is exceptionally large in the exemplary embodiment of FIG. 3 (about 270°), relatively large path length differences are achieved in a relatively small amount of space between each connecting waveguide and the next (its neighbor), resulting in being able to discriminate very small channel wavelength spacings among signals.

This arrangement is somewhat akin to that of a grating spectrometer with an integral number of slits or rulings for the grating wherein the spacing of the slits is arranged to ensure that strong constructive interference occurs of the light emerging from the slits for some particular wavelengths of light at some particular output position. In the Dragone router of FIG. 3 each of the connecting waveguides acts like a slit or ruling in the grating spectrometer so that strong constructive coupling from the initial input to the final output waveguides is achieved for particular wavelengths, and therefore the maximum performance of the router is obtained. To achieve an optimum result and maximum output optical signal from the Dragone router, it is desirable that each of the individual input to output waveguide connections in the router of FIG. 3 differ by about a single wavelength, or at least an integer number of wavelengths. This difference will produce constructive interference of the optical signals traversing the router and ensure that a strong output optical signal will be coupled from the router to the rest of the optical communication system. It should be recognized by those with skill in the art that angles other than 270° may be defined between the first plurality of output waveguides and the second plurality of input waveguides and that the change in the direction of the waveguides can be other than 270° depending on the wavelength multiplexing and/or demultiplexing which is to be achieved by the router and the particular application in which overlapped coupler combination 80 is to be used.

It will be further recognized by those skilled in the art that if the paths connecting the waveguides of the couplers 90, 100 were fully parallel, there would be no change in path length and, therefore, very little output wavelength selectivity for the optical signal power coupled to the other side of the optical communication system from the PLC. The size of the arc created by the individual connections between the respective coupler waveguides may also be enlarged to create a greater path length difference, although this would be at the expense of valuable wafer real estate which presents a problem depending on the application in which the overlapping coupler combination of the present invention is to be used. Increasing the amount of real estate used increases the cost of the PLC which may make the PLC impractical or undesirable to make. Moreover, in order to minimize cross-coupling between individual input and output waveguides, a larger turning angle should be used. It is also contemplated that the waveguide connections may be reversed so that the first plurality of input waveguides are coupled to the second plurality of output waveguides. All such embodiments and equivalents thereof are intended to be within the scope of the present invention.

Figure 4A:
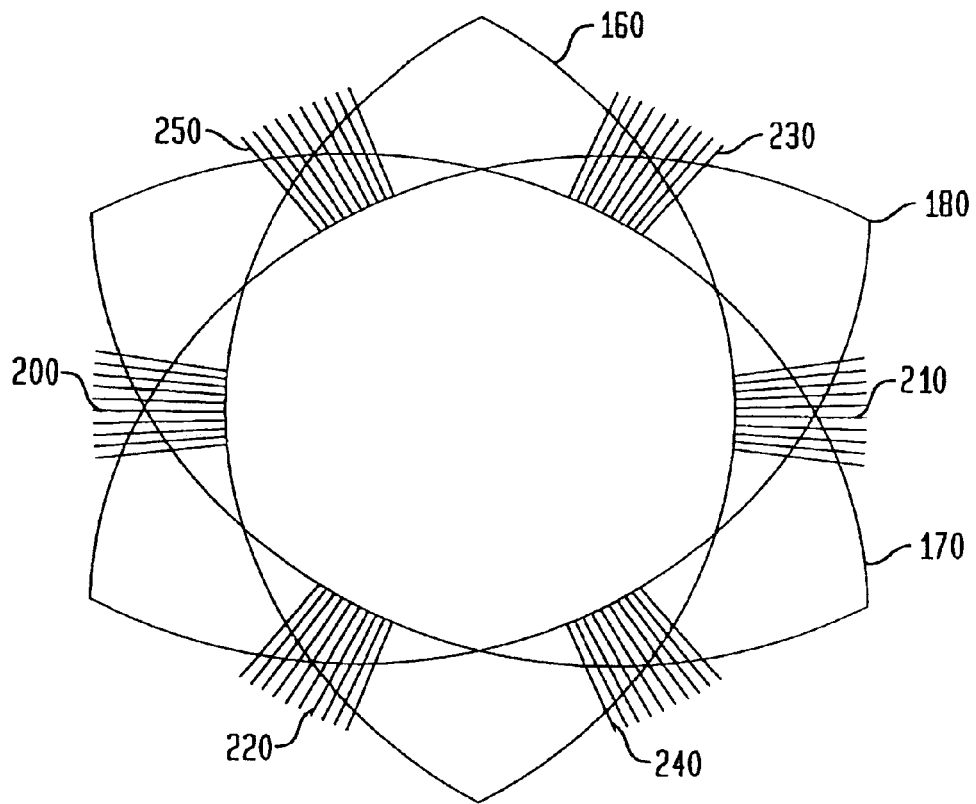
FIG. 4a shows a conceptual overlapped coupler of the present invention using three couplers.
Figure 4B:
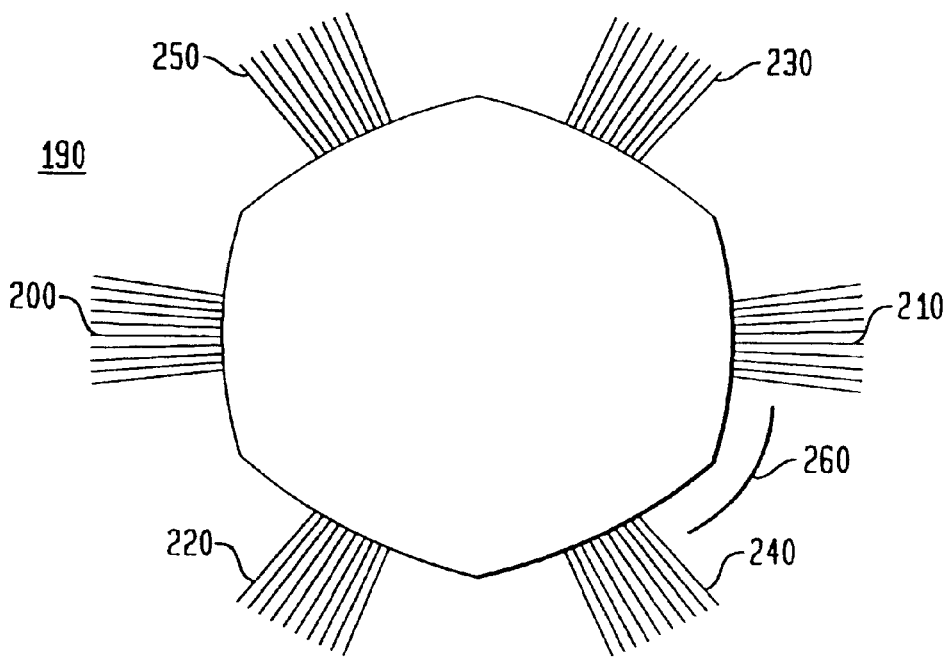
FIG. 4b shows the coupler combination of FIG. 4a wherein excess planar slab waveguide material in the individual couplers has been removed.

FIGS. 4a and 4b depict, respectively, the conceptual (FIG. 4a) and practical (FIG. 4b) three coupler overlapping combination wherein three couplers 160, 170, 180 are overlaid and the unused portions of the planar slab waveguide are removed to produce a useful three coupler combination 190 (FIG. 4b). It will be appreciated that first coupler 160 of FIGS. 4a and 4b includes at least one of input waveguide 200 and at least one output waveguide 210, that second coupler 170 includes at least one input waveguide 220 and at least one output waveguide 230, and the third coupler 180 includes at least one input waveguide 240 and at least one output waveguide 250. The appropriate connections between individual input waveguides and individual output waveguides will then be effected to achieve optimal optical signal propagation through the PLC in which three coupler combination 190 is to be used.

As can be seen, the angle 260 between at least one of the output waveguides 210 and the corresponding input waveguide 240 of the next coupler is about 240° in the three coupler combination of FIGS. 4a and 4b. The three coupler combination 190 is capable of accommodating and handling a greater number of optical signals since more input to output waveguide connections are present for a given amount of real estate. This is an extremely and advantageously useful result in some DWDM systems in which more optical signals are handled. It will be recognized by those skilled in the art that virtually any number of individual couplers can be overlaid in accordance with the present invention to produce multiple coupler overlaid combinations and that the number of overlaid couplers used will be limited only by the PLC design and particular system requirements in which such multiple overlaid coupler combination will be utilized.

The star couplers of the present invention also provide the ability to distribute signals with very low channel spacings. The signals can be spaced uniformly or non-uniformly and may be less than 100 GHz apart. More preferably, the channel spacings are less than about 25 GHz apart.

The overlapped couplers of the present invention are particularly useful when it is desired to route optical signals across or through one another because the light beams traveling in the directions of the overlapped couplers do not interact and the common planar slab waveguide region does not discriminate against light traveling in any direction as long as the optical signals are parallel to the surface of the PLC. Overlapped couplers of the present invention are of particular utility in constructing more compact DWDM routers with smaller channel spacings and the Dragone-type routers described with respect to FIG. 3. Additionally, the inventive overlapped N×M couplers will find use in implementing "bus-type" optical local area networks similar to ETHERNET (IEEE standard 802.3) networks wherein light must be broadcast to multiple input fiber bundles so that all output fiber bundles can receive the light, and in Token-Based-Bus systems (IEEE standard 802.4) in which internal procedures prevent collisions of signals and a token passing mechanism produces a yielding procedure for orderly optical communications. These and other applications will all benefit from, and be more efficiently implemented with, the use of overlapped coupler combinations provided in accordance with the present invention.

Thus, the overlayed coupler combinations described herein provide efficient and economical design capability and improvement for PLC designs. The coupler combinations of the present invention maximize the use of the area of a wafer on which the combination is fabricated, thereby increasing manufacturing efficiency and reducing the costs thereof. By overlapping individual couplers and locating the output waveguides at an angle with respect to the input waveguides, as described hereinabove, it is thus possible to control the constructive interference of the optical signals traversing through the individual waveguides. These results have not heretofore been achieved in this manner in the art.

While there have been shown and described and pointed out certain fundamental novel features of the invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same result are within the scope of the invention. Substitutions of elements from one described embodiment to another are also fully intended and contemplated. It is the intention, therefore, to be limited only as indicated by the scope of the claims appended hereto.

We claim:

1. A multiple coupler combination Photonic Lightguide Circuit (PLC), comprising:

a first coupler comprising a first planar slab waveguide operable for distributing the optical signals from an input region of the first planar slab waveguide to an output region of the first planar slab waveguide, said first coupler further comprising at least one input waveguide connected to the input region of the first planar slab waveguide for guiding optical signals input to the PLC to the first planar slab waveguide, and at least one output waveguide connected to the output region of the first planar slab waveguide for guiding optical signals out of the first coupler; and a second coupler intersecting the first coupler and further comprising a second planar slab waveguide at least a portion of which is in common with first planar slab waveguide operable for distributing optical signals from an input region of the second planar slab waveguide to an output region of the second planar slab waveguide, said second coupler further comprising at least one input waveguide connected to the input region of the second planar slab waveguide for guiding optical signals to the second planar slab waveguide, and at least one output waveguide connected to the output region of the second planar slab waveguide for guiding optical signals out of the second coupler to the optical communication system.

2. The coupler combination PLC of claim 1, wherein the first coupler comprises at least two outputs.

3. The coupler combination PLC of claim 2, wherein the second coupler comprises at least two inputs.

4. The coupler combination PLC of claim 3, wherein the at least two output waveguides of the first coupler are optically connected to the at least two input waveguides of the second coupler at an angle with respect to the at least two input waveguides so as to create a path length difference between individual optical connections between the first and second couplers.

5. The coupler combination PLC of claim 4, wherein said angle is about 270° C.

6. The coupler combination PLC of claim 4, wherein said angle is about 240° C.

7. The coupler combination PLC of claim 5, wherein said first and second planar slab waveguides comprise glass.

8. The coupler combination PLC of claim 5, wherein said first and second planar slab waveguides comprise InGaAsP.

9. The coupler combination PLC of claim 5, wherein the first and second planar slab waveguides comprise one of a polymer, a plastic and an epoxy.

10. The coupler combination PLC of claim 3, wherein said coupler combination device is configured as a Dragone router.

11. The coupler combination PLC of claim 5, wherein said coupler combination device is configured as a Dragone router.

12. The coupler combination PLC of claim 5, wherein the optical signals traversing through the combination comprise a uniform spacing.

13. The coupler combination PLC of claim 5, wherein the optical signals traversing through the combination PLC are spaced in channels having a channel spacing of less than about 100 GHz.

14. The coupler combination PLC of claim 13, wherein the optical signals traversing through the combination PLC are spaced in channels having a channel spacing of less than about 25 GHz.

* * * * *